May 14, 1968 G. H. MANSFIELD 3,383,425
SEPARATION OF HYDROXYDIPHENYLALKANES
Filed Sept. 28, 1964
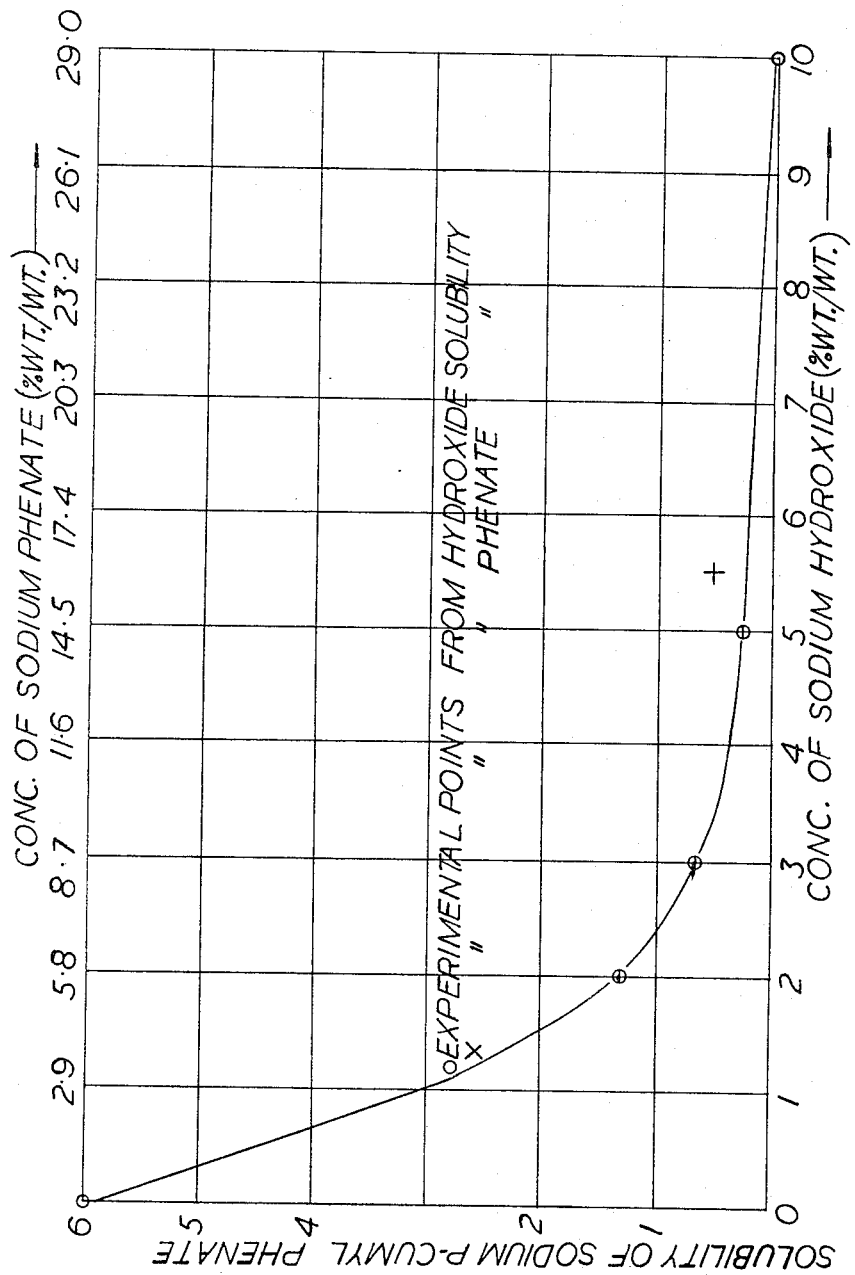
Inventor
GEOFFREY HARRY MANSFIELD
By Cushman, Darby & Cushman
Attorneys

United States Patent Office 3,383,425
Patented May 14, 1968

3,383,425
SEPARATION OF HYDROXYDIPHENYLALKANES
Geoffrey Harry Mansfield, Norton-on-Tees, England, assignor to Imperial Chemical Industries Limited, London, England, a corporation of Great Britain
Filed Sept. 28, 1964, Ser. No. 399,577
Claims priority, application Great Britain, Oct. 1, 1963, 38,597/63
8 Claims. (Cl. 260—619)

This invention relates to the separation of hydroxydiphenylalkanes and in one particular application to the separation of hydroxydiphenylalkanes from the products of the decomposition of alpha, alpha-dialkylarylmethyl hydroperoxides.

Processes are known whereby tertiary alkyl benzenes, in which the tertiary carbon atom is connected to the benzene ring, react with molecular oxygen to give alpha, alpha-dialkylarylmethyl hydroperoxides which under the influence of certain catalysts, e.g. acids, decompose to give phenols (by the term "phenol" in this specification is understood dihydric phenols and substituted phenols as well as phenol itself) and aliphatic ketones as main products, and several by-products among which are hydroxydiphenylalkanes for example 2-phenyl-2-(p-hydroxyphenyl) propane, (p-cumylphenol). The products of the decomposition are usually separated by distillation, including steam distillation. The hydroxydiphenylalkanes however, being of higher boiling point than the main reaction products described above, remain in the distillation residue together with other reaction by-products.

According to the present invention there is provided a process for the separation of hydroxydiphenylalkanes from the decomposition products of alpha, alpha-dialkylarylmethyl hydroperoxides which comprises treating the decomposition product with an excess of an aqueous sodium hydroxide solution to precipitate the sodium salt of the hydroxydiphenylalkane which is thereafter treated to obtain the hydroxydiphenyl alkane.

The precipitated alkali metal salt of the hydroxydiphenylalkane may be suitably separated and acidified to obtain the hydroxydiphenylalkane.

When the hydroxydiphenyl alkane is produced in the decomposition of an alpha, alpha-dialkylarylmethyl hydroperoxide, the phenol and ketone are preferably removed from the decomposition product before separating the hydroxydiphenyl alkane. A convenient way of removing the phenol and ketone is by distillation, including steam distillation. For example when cumene hydroperoxide is decomposed, acetone will be distilled over first followed by phenol leaving 2-phenyl-2-(p-hydroxyphenyl) propane in the distillation residue.

If desired, the separation of the hydroxydiphenylalkane may be facilitated by the addition of a hydrocarbon solvent for example, benzene, before the separation.

The attached graph shows the solubility of sodium p-cumylphenate in an aqueous sodium hydroxide solution and an aqueous sodium phenate solution. From this graph it is apparent that for substantially complete precipitation the sodium hydroxide solution used in the process must be in excess of that required to form the sodium salt, the concentration of the excess sodium hydroxide solution being suitably greater than 2% by weight but preferably greater than 8.5% by weight. The graph also indicates that if phenol is present, i.e. in the form of sodium phenate, precipitation still occurs providing that the requisite sodium ion concentration is present e.g. 5.8% by weight of sodium phenate provides the same sodium ion concentration as 2% by weight of sodium hydroxide, and 24.7% by weight of sodium phenate provides the same sodium ion concentration as 8.5% by weight of sodium hydroxide.

Following precipitation, the sodium salt of the hydroxydiphenylalkane may be filtered off, suspended in water, and acidified with, for example, carbon dioxide whereby the solid hydroxydiphenylalkane separates and may be isolated by filtration.

It is preferred to carry out the process at ambient or reduced temperature. A suitable temperature range is 0 to 40° C. preferably 0 to 20° C.

The filtrate remaining after the sodium salt of the hydroxydiphenylalkane has been separated consists of an aqueous sodium hydroxide layer containing any phenol not removed at an earlier stage in the process, and an organic layer containing other by-products of the reaction. On acidification of the aqueous sodium hydroxide layer the phenol is recovered, while the organic layer may be fractionated by distillation.

A particularly effective means of carrying out the present invention is to distil out the phenol and ketone from the decomposition products of the alpha, alpha-dialkylarylmethyl hydroperoxide (hereinafter referred to as stage I) and to treat the distillation residue remaining with excess aqueous sodium hydroxide solution. The sodium salt of the hydroxydiphenylalkane which precipitates is separated by, for example filtration (hereinafter referred to as stage II) suspended in water, acidified with, for example carbon dioxide and the hydroxydiphenylalkane separated by any convenient means. The liquid remaining, following the removal of the sodium salt of the hydroxydiphenylalkane at stage II consists of an aqueous caustic layer and an organic layer. These latter may be separated and the organic layer fractionated by distillation. The caustic layer may be acidified with for example carbon dioxide when any phenol not removed in stage I separates and is removed for example by filtration.

Example 1

A reaction mixture obtained by oxidising cumene with molecular oxygen and containing cumene hydroperoxide was decomposed by means of an acid catalyst, and the resulting acetone and phenol removed by distillation. 55 gm. of the residue remaining from this distillation was dissolved in 100 mls. benzene and treated with 200 mls. caustic soda solution (10% by weight). The precipitate of the sodium salt of 2-phenyl-2-(p-hydroxyphenyl) propane (p-cumylphenol) was filtered off, washed with 100 mls. caustic soda solution (10% by weight) and 100 mls. benzene, and suspended in water. Excess carbon dioxide was bubbled through the suspension and the white solid filtered, water washed and dried. Yield 17.5 gm. of 2-phenyl-2-(p-hydroxyphenyl) propane.

Example 2

50 gm. of the residue obtained as in Example 1 were treated with 180 mls. of sodium hydroxide solution (10% by weight) at 20° C. The precipitate of the sodium salt of 2-phenyl-2-(p-hydroxyphenyl) propane (p-cumylphenol) was filtered off and washed with 100 mls. sodium hydroxide solution (10% by weight) and dissolved in water. The aqueous solution was washed three times with 50 ml. portions of cumene, separated from the cumene and boiled to remove any traces of cumene remaining. Excess carbon dioxide was bubbled through the solution and the resulting white solid water washed and dried. The yield was 12.0 gm., of 2-phenyl-2-(p-hydroxyphenyl) propane.

Example 3

Example 2 was repeated but treatment of the residue was carried out at 50° C. instead of 20° C. Only 6 gm. of 2-phenyl-2-(p-hydroxyphenyl) propane, were obtained indicating the improved result by conducting the process at ambient or reduced temperature.

Example 4

Example 2 was repeated using a sample of residue obtained as in Example 1 but containing a different amount of 2-hydroxy-2-(p-hydroxyphenyl) propane. The yield in this case was 16.0 gm.

Example 5

Example 4 was repeated using 90 mls. instead of 180 mls. of 10% sodium hydroxide solution. The excess sodium hydroxide remaining in the aqueous phase was 7% by weight. The yield of 2-hydroxy-2-(p-hydroxyphenyl) porpane was reduced to 12.0 gm.

What is claimed is:

1. A process for the separation of p-cumylphenol from decomposition products of cumene hydroperoxide in which the sodium salt of p-cumylphenol is precipitated from the decomposition product by reacting it at a temperature between 0° and 40° C. with such an excess of aqueous sodium hydroxide that the concentration of sodium ions, apart from those associated with sodium p-cumylphenate in the liquid reaction product is greater than the concentration of sodium ions in a 2% by weight aqueous solution of sodium hydroxide and the precipitated sodium p-cumylphenate is acidified to obtain p-cumylphenol.

2. A process according to claim 1 in which the sodium salt of the p-cumylphenol is acidified with excess carbon dioxide.

3. A process according to claim 1 in which phenol and acetone are removed from the decomposition product of cumene hydroperoxide before reacting it with sodium hydroxide.

4. A process according to claim 1 in which the separation is carried out in the presence of an inert solvent.

5. A process according to claim 4 in which the inert solvent is benzene.

6. A process according to claim 1 in which the concentration of sodium ions, apart from those associated with sodium p-cumylphenate in the liquid reaction product is greater than the concentration of sodium ions in an 8.5% by weight aqueous solution of sodium hydroxide.

7. A process according to claim 1 in which the temperature lies between 0 and 20° C.

8. A process for the separation of p-cumylphenol from decomposition products of cumene hydroperoxide which comprises distilling off the phenol and acetone, precipitating sodium p-cumylphenate from the distillation residue by reacting it at a temperature between 0 and 40° C., with such an excess of aqueous sodium hydroxide that the concentration of sodium ions, apart from those associated with sodium p-cumylphenate, in the liquid reaction product, is greater than the concentration of sodium ions in a 2% by weight aqueous solution of sodium hydroxide, separating the precipitated sodium p-cumylphenate from the excess sodium hydroxide solution, mixing the precipitate with water, treating the mixture with excess carbon dioxide, separtaing off the p-cumylphenol and acidifying the said excess sodium hydroxide solution to recover any phenol that may be present.

References Cited

UNITED STATES PATENTS 2,750,426   6/1956   Armstrong et al. _____ 260—621

BERNARD HELFIN, *Acting Primary Examiner.*

LEON ZITVER, *Examiner.*

H. ROBERTS, *Assistant Examiner.*